C. A. VETTER.

WATERPROOF CAP AND SHELL FOR INCANDESCENT ELECTRIC LAMPS.

APPLICATION FILED FEB. 7, 1916.

Reissued July 25, 1916. 14,173

WITNESSES

W. T. Holman

Elbert L. Hyde

INVENTOR

Clarence A. Vetter

By Fred'k H. Hunter his Attorney

UNITED STATES PATENT OFFICE.

CLARENCE A. VETTER, OF PITTSBURGH, PENNSYLVANIA.

WATERPROOF CAP AND SHELL FOR INCANDESCENT ELECTRIC LAMPS.

14,173. Specification of Reissued Letters Patent. Reissued July 25, 1916.

Original No. 1,127,326, dated February 2, 1915, Serial No. 782,373. Application for reissue filed February 7, 1916. Serial No. 76,798.

*To all whom it may concern:*

Be it known that I, CLARENCE A. VETTER, a citizen of the United States, residing at Pittsburgh, in the county of Allegheny and State of Pennsylvania, have invented certain new and useful Improvements in Weatherproof Caps and Shells for Incandescent Electric Lamps, of which the following is a specification.

This invention relates to incandescent electric lamps and has for its object the provision of a weatherproof cap and shell requiring few, if any, screws or other metallic fastenings whereby the first cost as well as the cost of maintenance is reduced to a minimum.

With this and other objects in view, the nature, characteristic features and scope of the invention will more readily be understood from the following description taken in connection with the accompanying drawing, forming a part hereof, wherein—

Figure 1:
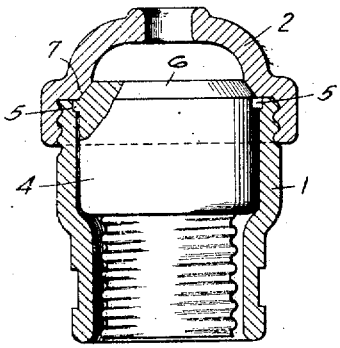
Figure 2:
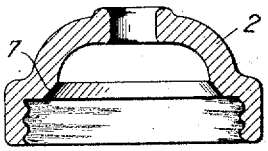
Figure 3:
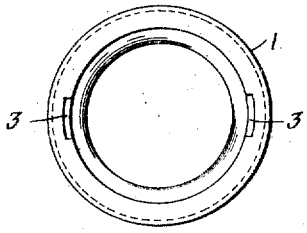
Figure 4:
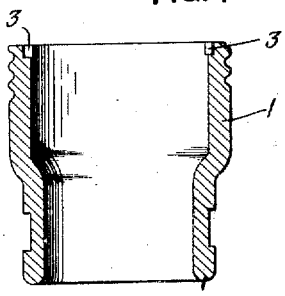

Figure 1, is a sectional view of a weatherproof shell and cap formed in accordance with my invention. Fig. 2 is a vertical cross-sectional view of the cap. Fig. 3 is a top view of the shell with the cap removed. Fig. 4 is a vertical sectional view of the shell; and Fig. 5 is a sectional view of a modification.

Referring to the drawing, the numeral 1, designates a shell formed of porcelain or an equivalent substance suitable for the purpose. Its complemental cap 2, which may be formed of the same material, has a depending flange or skirt with interior screw threads to engage a correspondingly threaded part of the shell. At opposite sides the rim or top of the shell is recessed, the recesses 3 being directed inwardly. The porcelain core or other insulation body 4 for the terminal wires has lugs or offsets 5, which take into said recesses and prevent the element 4 from turning. The periphery or crown of body 4 is beveled as at 6 and the shoulder 7 of the cap is correspondingly beveled so that when the cap is screwed to place the parts 6 and 7 take a binding fit.

Figure 5:
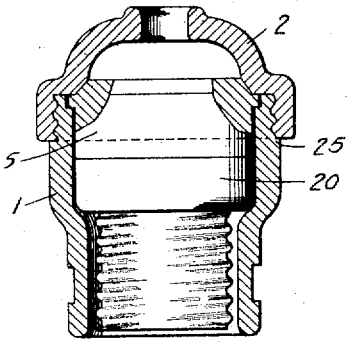

In the modification, Fig. 5, the porcelain or other core is in two parts 15 and 20, the part 20 being rotatable for interlocking purposes, as provided for in my prior application, Ser. No. 722,150, to prevent the unscrupulous removal of the lamp.

The part 15 is stationary as in Fig. 1.

The shell has a ledge or shoulder 25 against which the depending wall or skirt of the cap may abut.

It will be obvious to those skilled in the art to which the invention relates that modifications may be made in details without departing from the spirit and scope of the same. Hence the invention is not limited other than required by the state of the prior art.

Having described the nature and objects of the invention what I claim as new and desire to secure by Letters Patent is:—

1. The combination of a weatherproof shell externally threaded and having oppositely disposed inwardly opening notches, a porcelain or other core having lugs or offsets which engage said notches to prevent twisting of the core and having a beveled crown extending beyond the rim of the shell, and a weatherproof cap having a depending wall or skirt with threads which engage the threaded part of the shell and having a beveled shoulder which takes a binding fit on the beveled crown of the core.

2. The combination of a weatherproof shell, a cap having a threaded connection therewith, and an insulating core or body within said shell, said shell having a sectional recess in the end of its inner wall surface opening toward said cap, said core or body having an outwardly extending coöperating projection entering said recess, and said cap having a portion overlying and closing the open end of said recess and thereby confining said projection therein.

3. The combination of a weatherproof shell, a cap having a threaded connection therewith, and an insulating core or body within said shell, said shell at one point in its periphery having a sectional recess in the end of its inner wall surface, said core or body having an outwardly extending coöperating projection, said projection and recess being engageable and disengageable only by a relative endwise movement of said shell and core, and said cap having a portion overlying and closing the open end of said recess and thereby confining said projection therein.

4. The combination of a weatherproof shell externally threaded at one end, a cap having an internally threaded skirt screwing on said shell, and an insulating core or body within said shell, said shell having a sectional recess in the end of its inner wall surface, said core or body having an outwardly extending coöperating projection entering said recess, and said cap having a portion overlying and closing the open end of said recess and thereby confining said projection therein.

5. The combination of a weatherproof shell externally threaded at one end, a cap having an internally threaded skirt screwing on said shell, and an insulating core or body within said shell, said shell at one point in its periphery having a sectional recess in the end of its inner wall surface opening toward said cap, said core or body having an outwardly extending core or projection, said projection and recess being engageable by a relative endwise movement of said shell and core, and said cap having a portion overlying and closing the open end of said recess and thereby confining said projection therein.

6. The combination of a weatherproof shell externally threaded at one end, a cap having a threaded skirt screwing on said shell, and an insulating core or body within said shell said shell having a sectional recess in the end of its inner wall surface opening toward said cap, said core or body having an outwardly extending coöperating projection entering said recess and a portion extending beyond the end of said shell, and said cap having a portion overlying and closing the open end of said recess and also engaging the outwardly extending portion of said core or body, whereby to clamp said core in said shell and prevent turning movement of the core therein.

In testimony whereof I affix my signature in presence of two witnesses.

CLARENCE A. VETTER.

Witnesses:

ELBERT L. HYDE,

GLENN H. LERESCHE.